Oct. 23, 1928.

H. C. DRAKE ET AL 1,688,691

TRANSMISSION SYSTEM FOR AUTOMOTIVE VEHICLES

Filed May 5, 1922　　7 Sheets-Sheet 2

Inventors
Elmer A. Sperry
Harcourt C. Drake
By their Attorney
Herbert H. Thompson

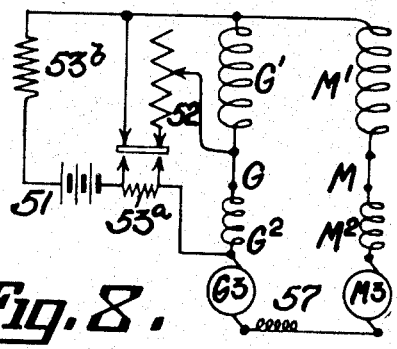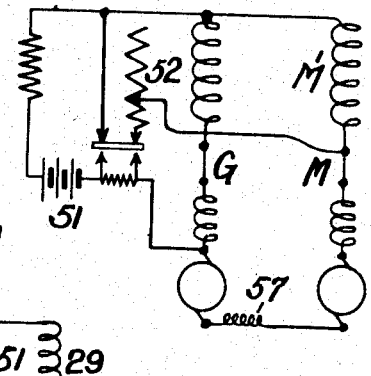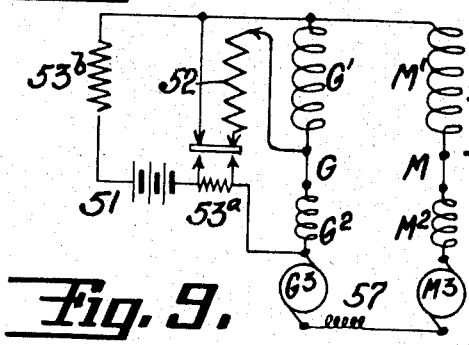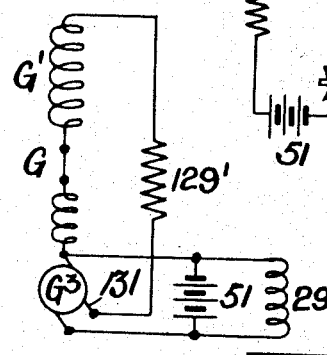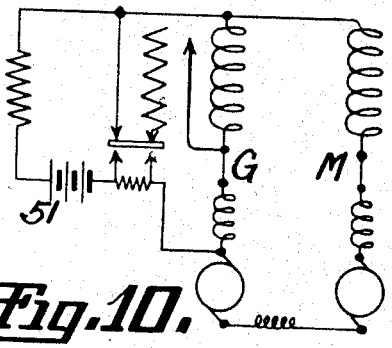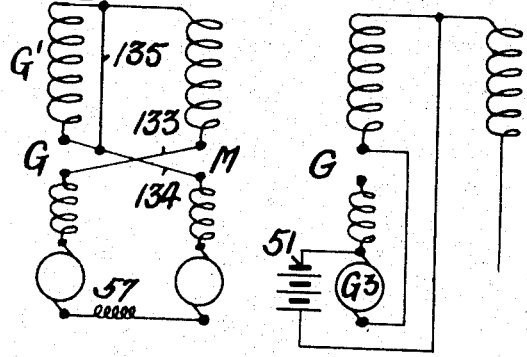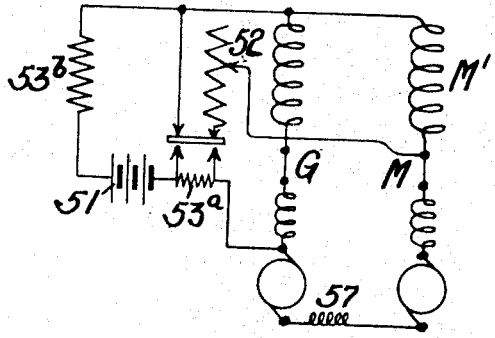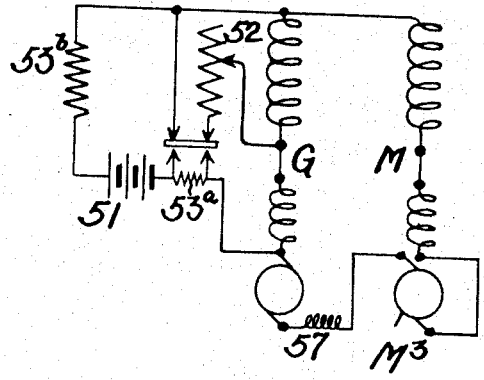

Oct. 23, 1928.

H. C. DRAKE ET AL 1,688,691

TRANSMISSION SYSTEM FOR AUTOMOTIVE VEHICLES

Filed May 5, 1922  7 Sheets-Sheet 4

Inventors
Elmer A. Sperry &
Harcourt C. Drake
By their Attorney
Herbert H. Thompson

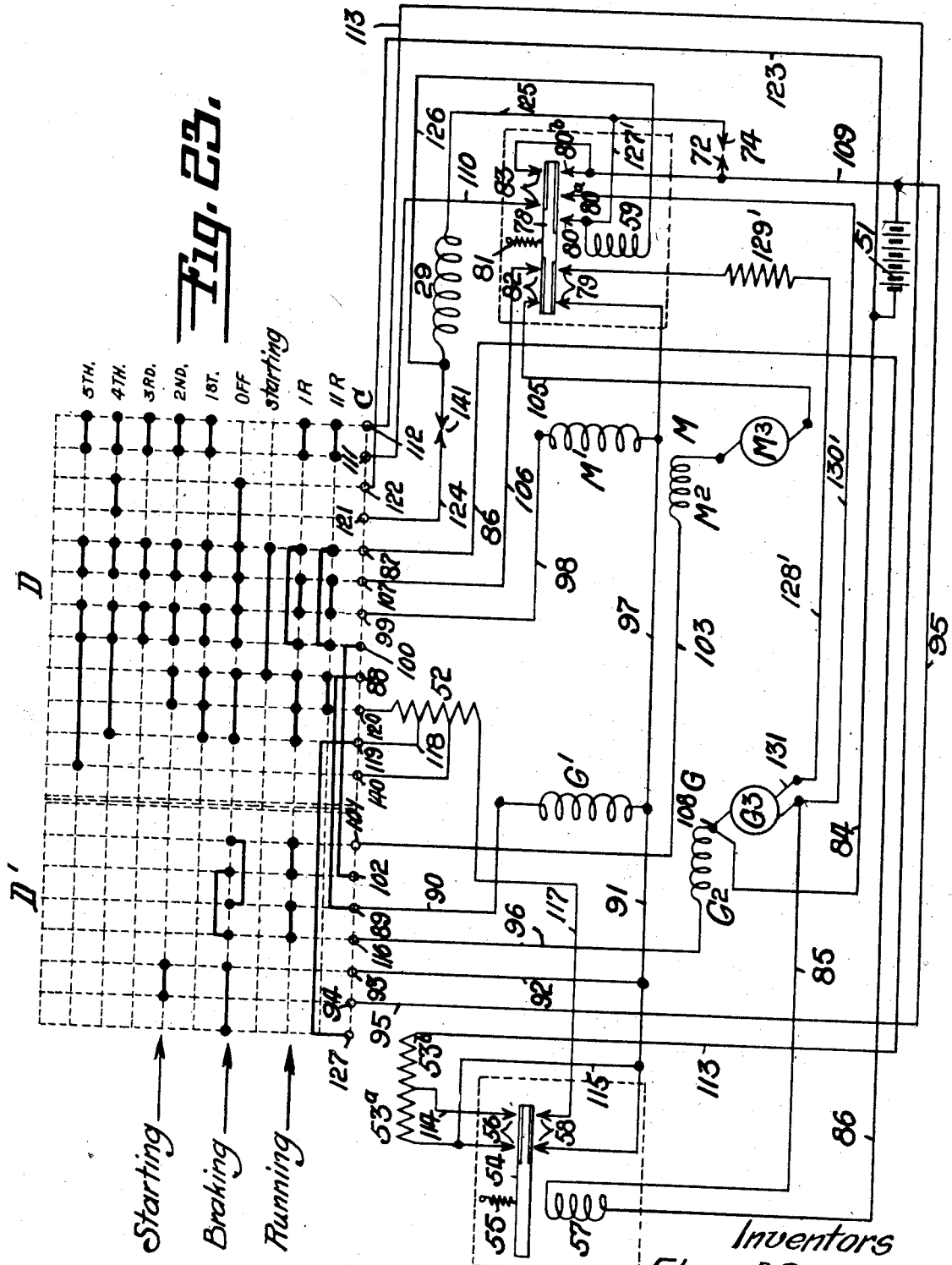

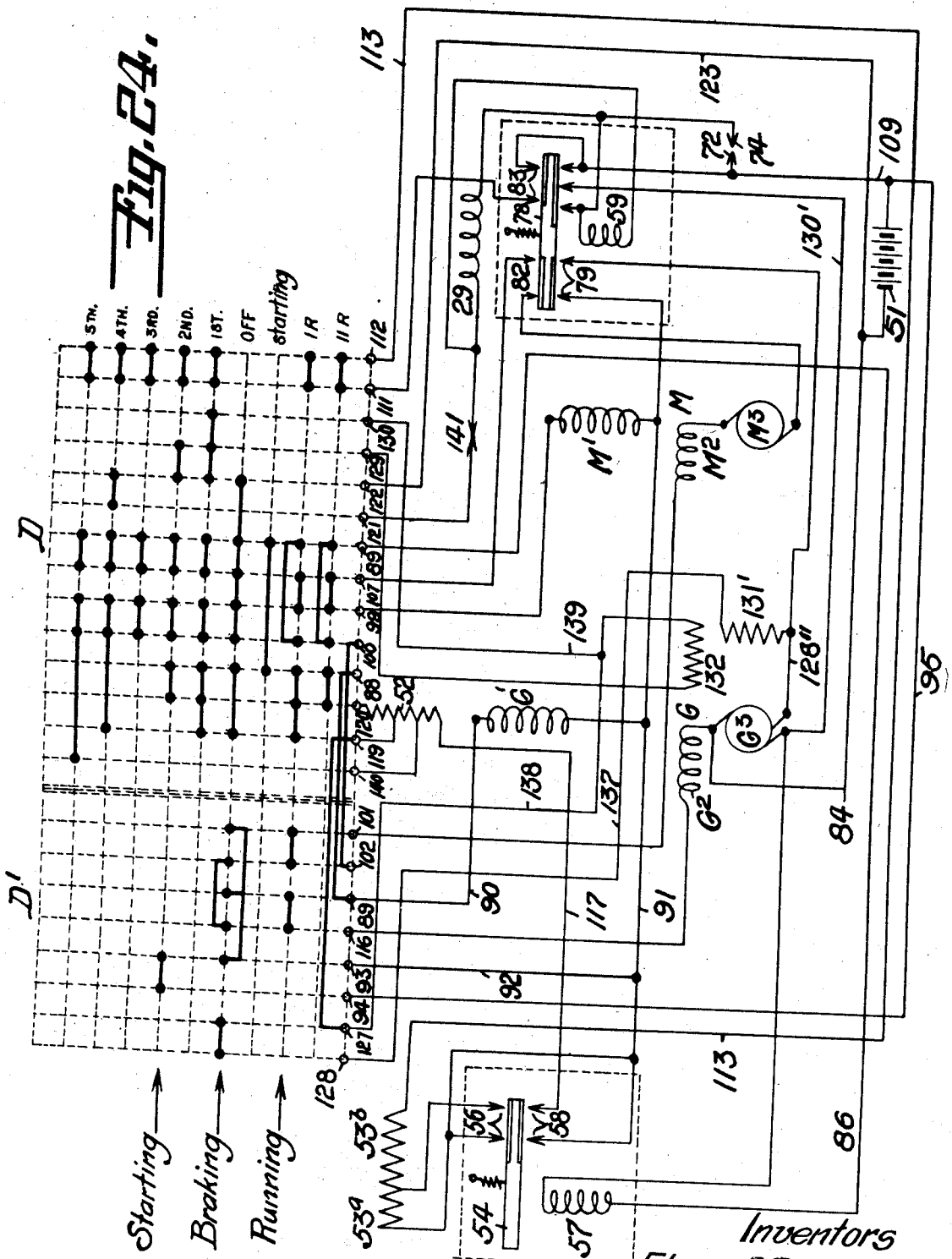

Oct. 23, 1928.
H. C. DRAKE ET AL
1,688,691
TRANSMISSION SYSTEM FOR AUTOMOTIVE VEHICLES
Filed May 5, 1922        7 Sheets-Sheet 7
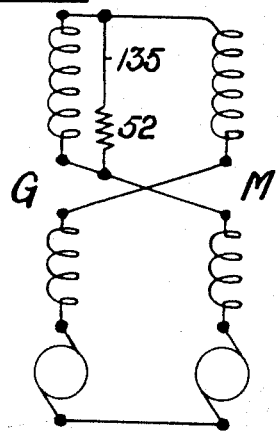
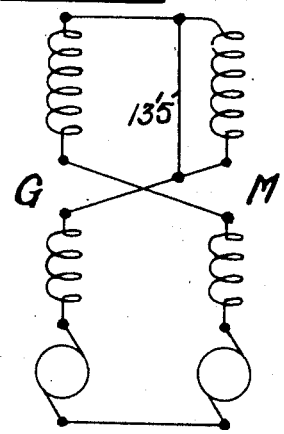
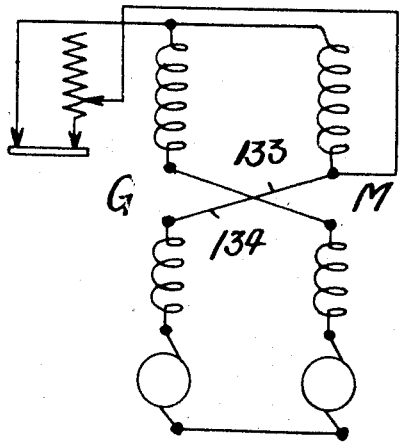
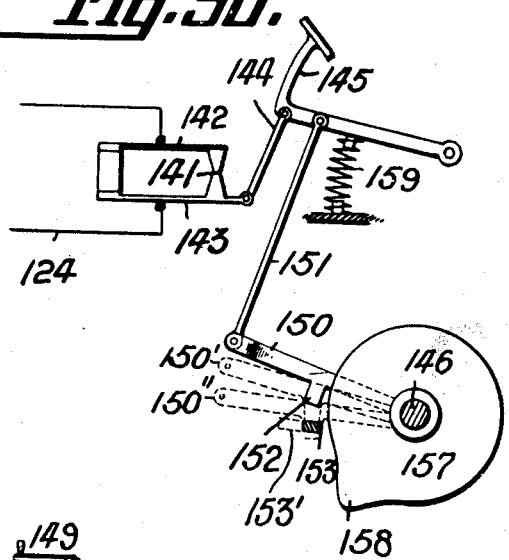
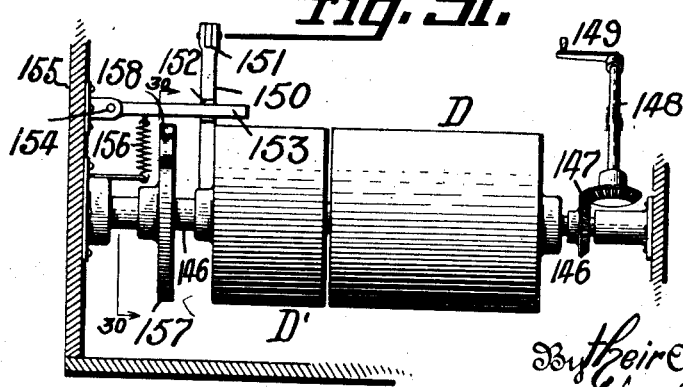
Inventors
Elmer A. Sperry
Harcourt C. Drake
By their Attorney
Herbert H. Thompson Patented Oct. 23, 1928.

1,688,691

UNITED STATES PATENT OFFICE.

HARCOURT C. DRAKE, OF HEMPSTEAD, AND ELMER A. SPERRY, OF BROOKLYN, NEW YORK, ASSIGNORS, BY DIRECT AND MESNE ASSIGNMENTS, TO SPERRY DEVELOPMENT COMPANY, OF DOVER GREEN, DELAWARE, A CORPORATION OF DELAWARE.

TRANSMISSION SYSTEM FOR AUTOMOTIVE VEHICLES.

Application filed May 5, 1922. Serial No. 558,643.

This invention relates to power transmission mechanism especially adapted for vehicles. It consists in substituting a coupling between the prime mover and the running gear of the vehicle which has the following peculiarities:

It has long been known that the smoothest possible acceleration of a vehicle is secured by using electro-dynamic means. This has been abundantly established by the application of the Entz system. This, however, has been found to have very serious drawbacks, such as, running in one direction only, and especially in continuous running of the car there are large losses due to both the generator and the motor which are inherent in electrical equipment, increasing the expense of operation.

It is the object of the present invention to utilize all of the good features of the electro-dynamic system and to eliminate the bad features. This is accomplished by dividing the transmission into two parts, consisting of the electro-dynamic connection and a straight-through mechanical connection, confining the former to its sphere of greatest contribution, namely, the smooth and powerful acceleration of the car, and when this has been accomplished doing away with it entirely and sustituting therefor the straight-through connection which is purely mechanical and has ideal efficiency.

In all the present day motor vehicles the flexibility of the engine is depended upon for speed control of the vehicle when the straight-through connection is in operation, but in this case the same flexibility of the engine speed control may be utilized in the electro-dynamic mechanism during the acceleration period as hereinafter described.

The characteristics of the electro-dynamic accelerator portion of our drive are that it not only accelerates but develops torque in response to the speed of the prime mover, while the torque delivered is proportionate to the differential speeds of the driver and driven element, said torque being greatest when this factor is the highest, namely, when the driven element is at rest and the driver is operating at considerable speed. Another valuable factor is the controller action in varying the coupling between the generator and motor whereby another variation of the torque range or gradient is secured. Under this arrangement, when applied to a self-propelled vehicle, the first of these machines may, under certain conditions be operated as a motor, as for instance to start the engine, or for braking; otherwise this machine normally acts as a generator. The second machine normally acts as a motor, receiving energy from the generator to drive the vehicle, but under certain conditions, as for instance, when braking, it may act as a generator.

It has heretofore been proposed to couple the driving and driven elements together when it is desired to obtain a one-to-one ratio drive. When this is done by means of a non-friction mechanical clutch, it will readily be seen that the speed of the driven element must suddenly conform to that of the driving element. The shock produced by such coupling has been found to result in breaking of parts of the apparatus. Moreover, with other accepted types of clutches, effective coupling takes place when the clutch is applied, irrespective of which machine is running the faster.

One of the objects of this invention is to provide an improved clutch for coupling the driving and driven elements for one-to-one drive which will possess a resilient gripping effect when brought into operation to overcome shock and jerking of the vehicle and also to prevent breaking of parts. This clutch is brought into engagement usually when the speeds of the driving and driven elements are not far from the same, the acceleration of the driven element up to this point having been performed by the electro-dynamic means referred to above.

Another object is to provide a clutch which besides having the aforesaid advantages, will, when brought into operation, serve to couple the driving and driven elements only when a predetermined relationship in speed exists between these elements. As stated above this relationship is usually on the order of general equality of speeds. Thus we see that there is provided means for bringing the driven element or running gear of the vehicle up to any desired speed by gradual acceleration contributed by the electrical equipment, whereupon as by dropping down the engine speed, such relationship of speeds as has been predetermined is established. The clutch serves to automatically and mechanically couple the driving and driven elements independently of the electrical equipment with its lower efficiencies which now ceases to function and is done away with completely as far as any contribution it makes to the driving of the vehicle is concerned.

Another object of the invention is to provide an electrical transmission system wherein commutator arcing normally present in regenerative braking may be avoided.

Another object is to prevent the electric motor from stalling the engine when the car begins to coast.

Another object of the invention is to divide up the transmission into two parts, one performing the functions of accelerating the load, while the other performs the straight-through coupling, this combination having the advantage of performing the continuous driving of the vehicle through a substituted connection having high and practically perfect efficiency and thereby cutting out the losses that are inevitably associated with the accelerating portion of the transmission as a whole. Although the accelerator or electro-dynamic portion of the transmission may have high efficiency yet its losses are continuous when it is used as a continuous drive of the vehicle. The difficulty is overcome by substituting for it the straight-through mechanical connection doing away entirely with any further functioning or operation of the accelerating factor.

An important factor of the transmission which will be appreciated constitutes an added point in the preferred form of this invention. After the acceleration has reached any desired point the straight-through connection is effected automatically by simply establishing any predetermined approach to equality of speeds between the driving and the driven elements, the operation of this coupling being fully described herein.

Referring to the drawings wherein we have shown what we now consider to be the preferred form of our invention, Fig. 1 is a side elevation, partly in section, of the electro-dynamic transmission mechanism.

Figs. 7 to 11 represent electrical connections which may be employed to obtain various speeds.

Fig. 12 represents connections adapted to mechanically couple the driving and driven elements.

Fig. 13 is a diagram of the connections which may be employed to reverse the direction of movement of the driven member.

Fig. 14 is a diagram adapted to brake the vehicle.

Fig. 15 shows connections which may be used to start the engine.

Fig. 23 is a complete wiring diagram including the control drum for effecting the various connections, illustrated in the diagrams shown in other views.

Fig. 24 is a similar diagram showing an arrangement adapted for more effective braking.

Figs. 27, 28 and 29 are wiring diagrams of the electrodynamic machines for various braking positions.

Fig. 30 is a diagrammatic detail of a circuit breaking device controlled by the braking pedal.

Fig. 31 is a view of the control drums.

Figure 1:
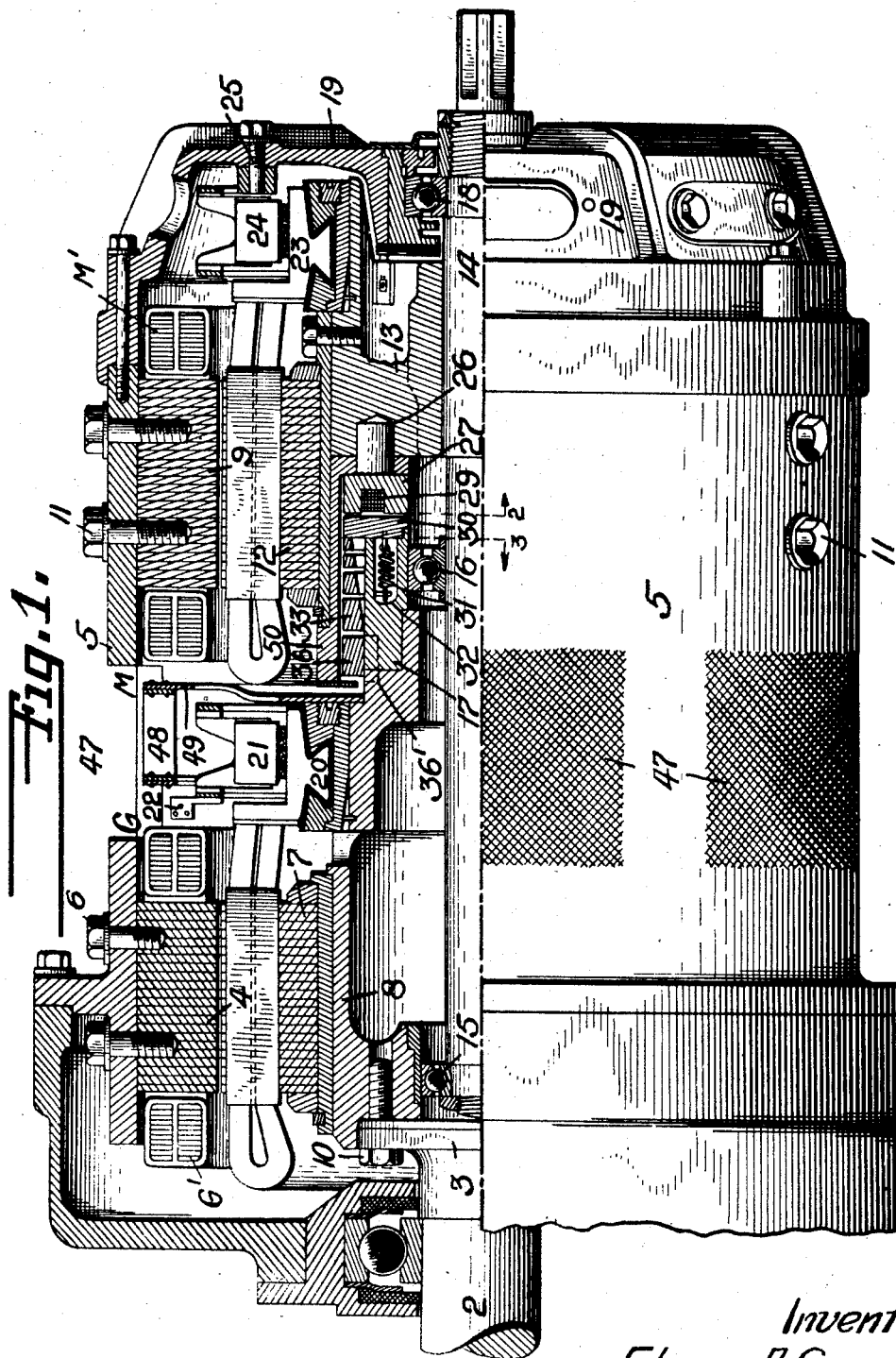

In the drawings we have shown our invention adapted for use in connection with an automobile.

In Fig. 1, the usual automobile engine is indicated at 1, provided with a driving shaft 2, which in turn is shown as having a flange 3. The electro-dynamic system is shown as comprising a dynamo-electric machine G adapted to act normally as a generator driven by the engine 1, and a second dynamo-electric machine M adapted to act normally as a motor receiving current from machine G to propel the vehicle.

The generator is shown as comprising field windings $G^1$, field poles 4 fixedly secured to a casing or shell 5 as by means of bolts 6, and an armature 7 mounted on a sleeve member 8 which may be secured by bolts 10 to the flange 3 of shaft 2. The motor comprises field windings $M^1$, field poles 9 fixedly secured to the aforesaid shell 5 by bolts 11 and an armature 12 securely mounted on a member 13 which is in turn fixed on a second shaft 14. This shaft which may be connected in the usual manner for propelling the vehicle may be termed the driven shaft, and is shown aligned with the engine driving shaft 2. It may reach into the sleeve 8 and have bearing connection therein as at 15 and 16; the latter bearing being shown as supported within an annular member 17 fixedly carried by said sleeve 8. An additional bearing 18 may be provided for the driven shaft, the same being carried by the end or bell piece 19 of the shell 5. The commutator 20 of the generator is carried on sleeve 8, while the brushes 21 are secured as at 22 to the shell 5. In like manner the commutator 23 of the motor is carried on member 13 and the brushes 24 are secured at 25 to the end 19 of the shell 5.

Figure 2:
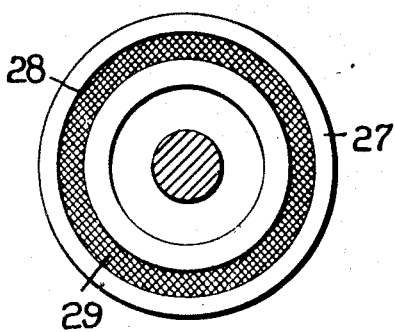
Fig. 2 is a view of the face of one of the friction members of the clutch taken substantially on dotted line 2 of Fig. 1.
Figure 3:
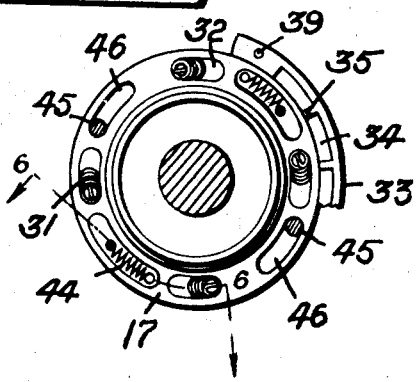
Fig. 3 is a detail of the clutch taken substantially on dotted line 3 of Fig. 1.
Figure 4:
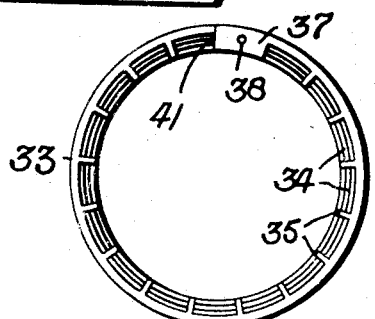
Fig. 4 is a view of an expansion spring which fits over the member shown in Fig. 3 and is taken on the same line as Fig. 3.
Figure 5:
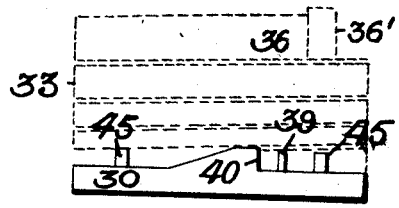
Fig. 5 is a detail side view of the other of the friction members of the clutch and also of the member shown in Fig. 4.

Fixedly secured to member 13 as by means of pins 26 is an annular member 27 (see also Fig. 2) provided with an annular groove 28 containing an electric coil 29. Opposite said member 27 is a second annular member 30 (see also Fig. 3) resiliently secured by springs 31 to sleeve 8; said springs 31 reaching into and being fastened near the inner end of holes 32 provided in member 17 (see also Fig. 6). A relatively heavy coil spring member 33 (Figs. 1, 4 and 5) is also connected to the sleeve 8 and member 30. As will be seen the several coils of the spring 33 may be progressively lighter; being not only successively narrower as shown in Figs. 1 and 5, but being also machined out, as indicated at 34 in Fig. 4 and as clearly seen in Fig. 1. In machining out this spring at 34 small sections 35 may be permitted to remain to rest against member 17 to keep the spring concentrically disposed about said member 17. The forward end 36 may engage a stop 36' fixed in sleeve 8 so as to be rotated thereby, when the sleeve 8 is rotating counterclockwise, while the opposite end 37 may have a small hole 38 engaging a pin 39 fixed to member 30. A projecting portion 40 may also be provided on member 30 to butt against the end face 41 of spring 33.

It will be seen from Fig. 5, that, should member 30 be rotated in a clockwise direction relative to sleeve 8, the spring 33 will tend to be unwound. This unwinding tendency of the spring will in turn cause the spring to expand and engage the adjacent inner wall of a shell or cup-like member 50 which is also fixed by pins 26 to member 13. Thus, should the coil 29 be energized bringing member 30 into frictional contact with member 27, when the sleeve 8 is turning in a counter-clockwise direction (Fig. 5) faster than member 13, the spring 33 will engage cup member 50. The resultant friction between the cup and spring will tend to further unwind and expand the spring so that a firm gripping or clutching effect will take place between the driving and driven shafts 2 and 14 respectively. Should opposite relative movement of the members 27 and 30 be taking place when coil 29 is energized, it will be obvious that the spring 33 cannot be expanded into contact with cup 50 and no clutching is effected except that due to the friction between plate 30 and member 27. Thus, the clutch can only take hold when the speed of the driving shaft is momentarily greater than that of the driven shaft.

Figure 25:
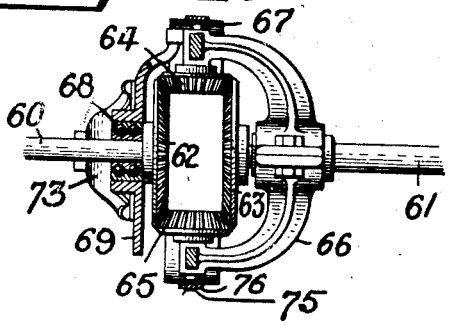
Fig. 25 is a side elevation, partly in section, of a contact making device actuated differentially by the driving and driven elements for effecting the mechanical clutching of the elements.
Figure 26:
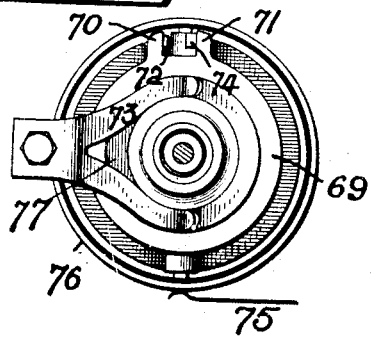
Fig. 26 is another view of said device looking at Fig. 25 from the left thereof.

As explained in prior patent to Elmer A. Sperry, No. 1,600,651, Sept. 21, 1926, we prefer to provide a device for causing the clutch coil 29 to be energized whenever under certain conditions the speed of the driving shaft begins to fall below that of the driven shaft or has any predetermined established speed ratio desired. This means that the accelerating portion of the drive has accomplished its purpose and the time has come to eliminate it entirely from the operation of the vehicle together with its losses and to substitute therefor the straight-through mechanical connection which has 100% efficiency. This device is shown in Figs. 25 and 26. In these views the shaft 60 may be the vehicle speedometer shaft which is commonly connected with the driven or propeller shaft, and the shaft 61 may be the pump shaft of the engine, which shaft is commonly driven by the driving shaft. These shafts are shown as actuating differential gearing comprising a bevel gear 62 fixed on shaft 60, a similar bevel gear 63 fixed on shaft 61 and bevel pinion 64, 65 engaging said gears. Pinions 64, 65 are rotatably mounted in a member 66 which is in turn rotatably mounted on shaft 61 and carries an annular member 67. Mounted on shaft 60 on non-friction bearings 68 is a member 69 carrying on its periphery a pair of prongs or projections 70, 71, the former of which is provided with a contact 72. A forked spring member 73 may be provided to bear against member 69 with sufficient pressure to prevent rotation of said member in response to rotation of shaft 60. Member 66 is provided with a projecting contact 74 disposed between prongs 70, 71. With this construction, rotation of shaft 61 in excess of rotation of shaft 60 will cause contact 74 to engage prong 71 and carry member 69 along with it. When, now, shaft 60 commences to rotate faster than shaft 61, member 66 is turned in the reverse direction to bring contact 74 into engagement with contact 72. A circuit, as hereinafter disclosed, will thereby be closed to energize the clutch coil and establish the storage battery charging connections. Spring 73, of course, permits rotation of members 69 in response to pressure produced by members 66. Current may be led to contact 74 by means of a brush 75 and a slip ring 76, the latter being carried by member 66. Contact 72 may be suitably connected to a slip ring 77 on member 69 and current may be led to said slip ring through spring member 73. The manner whereby the closing of contacts 72, 74 establishes the proper clutch coil and battery charging connections will hereinafter be disclosed.

The manner in which the clutch usually comes in, in operation, is as follows: The clutch, of course, cannot take hold irrespective of the relative speeds or direction of rotation of the driving and driven member unless the coil 29 is excited, as it is held out of engagement by the spring 31. When, however, the speed of the driven shaft tends to exceed that of the driving shaft (and if the controller is in the proper position as hereinafter explained), coil 29 will be excited causing member 30 to frictionally engage clutch 27. At this instant, however, since the driven shaft is rotating the faster, the coil clutch 33 will not take hold as explained hereinbefore. At the time, however, that the clutch coil 29 is excited, the circuit between the motor 9 and generator 4 is broken, as explained hereinafter, thus momentarily removing or reducing the load on the engine. This fact and also to a lesser extent the placing of a slight additional load on the driven shaft by the friction between members 30 and 27 results, of course, in an immediate increase in the engine or driving shaft and the dropping off in the speed of the driven shaft so that they momentarily become equal and the driving shaft starts to pass that of the driven shaft, or in other words, the driving shaft tends to drive the driven shaft through the clutch face 30. This instantly expands the clutch spring into firm engagement with the cup 50 and thereafter the driving and driven shafts rotate as one. It will readily be understood that the aforementioned actions may be hastened by proper manipulation of the throttle of the engine by slowing down and speeding up the engine at the proper times.

Figure 6:
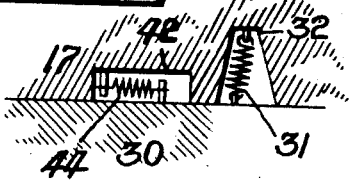
Fig. 6 is a fragmentary sectional view taken substantially on line 6—6 of Fig. 3 with a fragment of the member shown in Fig. 5 added.

As shown in Fig. 6 the hole 32 in member 17 may be made wider near its outer end to permit lateral play of spring 31 so that member 30 can rotate with respect to member 17. Also carried in a depression 42 in member 17 is a spring 44 connected at one end to the member 17 and at the other to member 30 as shown. This spring will tend to rotate member 30 in a counter-clockwise direction, thus serving to return the same to its normal position. Stops may be provided to limit the degree of rotation of member 30 in either direction. Such stops may comprise pins 45 integral with member 30 reaching into grooves 46 in the member 17.

The shell 5 may be provided with openings 47. Adjacent these openings are shown fan blades 48, attached by a frame 49 to sleeve 8. Thus, when the apparatus is in operation the fan 48 will serve to blow air out of the shell, thereby inducing a circulation of cool air through the shell and the elements contained thereby to keep the apparatus cooled.

In Fig. 23 I have shown a wiring diagram of the apparatus and a control drum for effecting the various electrical connections. In this diagram it is of course understood that the controller brushes in row C are stationary, while the drums D and D' rotate so as to effect the connections. The drum D' may be actuated by the usual starting and braking pedals, while the drum D may be actuated by the usual hand control lever.

In the diagram the generator and motor field windings are shown at $G^1$ and $M^1$ respectively.

In order to avoid sparking in the commutators of the machines, especially when the machines are subjected to heavy braking, we prefer to use machines having interpoles. The windings of these poles of the generator and motor are shown at $G^2$ and $M^2$ respectively. A battery is shown at 51. This battery may be used to run the generator as a motor when starting the engine and may, of course, be used for lighting and other purposes, and is also adapted to be recharged by the generator. A resistance 52 is also shown and is used to vary the strength of the fields of the machines in effecting changes in the speed of the driven shaft. Additional resistances $53^a$, $53^b$, may be used to control the excitation of the generator fields. These resistances may be placed wholly or partially in circuit with said fields through a double throw switch or contact member 54. This switch may be held by a spring 55 to normally bridge contacts 56, and is actuated by a magnet 57 to disengage said contacts and to close contacts 58. The clutch coil 29 is shown in circuit with contacts 72, 74. A magnet 59 is also associated with these contacts 72, 74 which we may term differential contacts by reason of their control by the differential mechanism. Magnet 59 is adapted to attract a contact member 78 to close contacts 79 and contacts, 80, $80^a$ and $80^b$. Said contact member is normally held by a spring 81 in the upper position, closing contacts 82 and contacts 83.

To start the engine of the vehicle, drum D may be rotated to bring the contacts in the row marked "Starting" into engagement with those in row C, while drum D' is actuated to move the starting contacts thereof to row C. This will establish a circuit through the battery 51 and machine G in the reverse direction to which it flows when this machine is acting as a generator, so that it will now act as a motor to turn the engine over for starting. The circuit may be traced as follows: From battery 51 through conductor 84; the armature of machine G; conductor 85; coil 57; conductor 86; controller contacts 87, 88, 89, conductor 90, field coils $G^1$, conductors 91, 92, contacts 93, 94, conductor 95 and back to the battery. This circuit simplified, is shown in Fig. 15. After the engine has been started, the drum D may be moved to the "off" position, and drum D' may, as is the usual practice when the starting pedal is released, move to "running" position, which is the normal position of this drum. With these connections, the field windings of the generator (Fig. 14) are short circuited so that no current flows through the system.

The vehicle may now be caused to move forward at any one of several speeds by placing the drum D in any of positions 1 to 5. To run at the lowest speed for instance, the drum D is turned to 1st position; drum D' being normally in "running" position as we have seen. The connections established will be as follows: From the armature $G^3$ of the generator, through the interpole windings $G^2$; conductor 96; contacts 116, 89; conductor 90; field windings $G^1$; conductor 97; motor field windings $M^1$; conductor 98; interpole windings $M^2$; motor armature $M^3$; conductor 105; contacts 82; conductor 106; contacts 107, 87; conductor 86; magnet 57; conductor 85 and back to the generator armature. Incidently, a circuit is provided across the generator field windings as follows: From point 108; through conductor 84; battery 51; conductor 109; contacts 83; conductor 110; contacts 111, 112; conductor 113; resistance $53^b$; conductor 114; contacts 56; conductors 115, 91; windings $G^1$; conductor 90; contacts 89, 116; conductor 96; coil $G^2$ and back to point 108. This second circuit, which includes the battery 51 serves to excite the generator field windings, and promotes a rapid building up of the strength of the generator. As soon as the generator field has built up to a predetermined value, the strength of magnet 57 overcomes the action of spring 55, drawing contact member 54 away from contacts 56 and into engagement with contacts 58. This cuts in resistance $53^a$, thereby reducing the flow of current from the battery through the generator field. Also, the throwing of contact member 54 introduces a shunt around the generator field $G^1$ as follows: From said field, through conductor 91; contacts 58; conductor 117; through a portion of resistance 52 and out by way of conductor 118 to contacts 119, 88; contact 89; conductor 90 and back to field $G^1$. This shunt, of course, weakens the generator field and results in a low motor speed. The amount of resistance 52 included in the shunt, of course, determines the value of said speed and the speed of the vehicle.

The wiring diagram of the dynamo-electric machines after the actuation of contact member 54, for the first running position is shown in its simplest form in Fig. 7.

When drum D is turned to position marked "2nd", the only change made is the cutting out of controller brush contact 119 so that the whole of resistance 52 is now shunted across the generator field. This condition is illustrated in Fig. 8.

The third speed position of drum D cuts out brush contacts 88, 120 and thus eliminates the field shunt as shown in Fig. 9. As above stated the flexibility of the engine plays a very important part in the acceleration of the vehicle in any of the above controller or speed positions without further movement of the controller, so that the acceleration is primarily due to the very great flexibility of the engine speed and the torque follows from the same cause due to the differential speeds between the motor and the generator demonstrating one of the greatest values of the electro-dynamic system in that the torque is greatest at start or when the motor has zero or a very low speed, and becoming less intense as the relative speeds decrease. The above controller positions it will at once be seen are simply means for giving different gradients to the torque relation established by the differential speeds.

The fourth position again introduces a portion of resistance 52, but this time, shunts the same across the motor field $M^1$ through the following circuit: From field $M^1$; through conductors 97, 91; contacts 58; conductor 117; resistance 52; conductor 118; brush contacts 119, 99; conductor 98 and back to field $M^1$. The circuit in the fifth position is similar to that in the fourth, excepting that in the fifth, a smaller amount of resistance 52 is included in the motor field shunt, the outlet being through contact 140. The fourth and fifth positions are shown in simple diagrams in Figs. 10 and 11 respectively.

In the fourth position it will be seen that controller contacts 121, 122 are bridged. This closes one of two openings in the circuit which includes the clutch coil 29; the other of these openings being at contacts 72, 74 which are controlled by the differential device shown in Figs. 25, 26. Thus, with the machines operating in the fourth running position, as soon as the speed of the driven or propeller shaft overtakes and/or tends to exceed that of the driving or engine shaft, as for instance, when the vehicle is running on level ground or down hill and the driver temporarily reduces the engine speed by taking his foot off the "gas" pedal, for instance, the differential contacts 72, 74, will be closed. The clutch coil will thus become energized through the following circuit: From battery 51; through conductor 123; contacts 122, 121; conductor 124; coil 29; conductor 125; contacts 74, 72; conductor 109 and back to the other side of the battery. The operation of the clutch between the driving and driven shafts when coil 29 is energized has hereinbefore been described, and it will be remembered that the clutch does not actually take hold until the engine is again speeded up to overtake the driven shaft. The closing of contacts 72, 74 will also establish a circuit through magnet coil 59 as follows: From the battery 51; through conductor 123; contacts 122, 121; conductor 126; coil 59; conductors 127', 125; contacts 74, 72; conductor 109 and back to the battery. The resultant energization of magnet 59 will move the contact making armature 78 from the upper row of contacts to the lower row. This will establish a new set of circuits. One of these circuits includes magnet 59 as follows: From battery 51 through conductor 123; contacts 122, 121; conductor 126, coil 59; contacts 80, 80$^b$; conductor 109 to the battery. It will be seen that contacts 72, 74 having caused energization of magnet 59, the shifting of armature 78 will shunt said magnet around said contacts to establish a more permanent circuit with the battery. Thus, should the differential contacts subsequently be shaken open or otherwise opened, the magnet will continue to be energized.

It will also be seen that the shifting of armature 78 will break the circuit between the generator and motor and establish a battery charging circuit as follows: From the generator armature G$^3$ through conductor 84; through the battery 51; conductor 109; contacts 80$^b$, 80$^a$; conductor 130' and back to said armature. The generator fields may be properly weakened for the battery charging function by shunting a resistance 129' around the fields and part of the armature. This shunt circuit may connect with the armature by means of a specially positioned third brush 131 in the well known manner and may be traced through conductor 128'; resistance 129'; contacts 79; conductor 97; field G$^1$; conductor 90; contacts 89, 116; conductor 96; interpole field G$^2$ and back to the generator armature. The clutch coil and the battery charging circuits are shown in Fig. 12.

It will be recognized that after the drum D has been turned to the fourth running position establishing the connections shown in Fig. 10 and thereafter, the conditions represented in Fig. 12 automatically come into play, these latter conditions cannot be changed automatically, as by reversion of the relative speeds of the driving and driven members to their prior state, or otherwise, but must continue until altered by the operator. Such change may, of course, be effected by actuating the controller to third or fifth position.

To reverse the direction of rotation of the driven shaft, and consequently, the direction of travel of the vehicle, I may reverse the direction of flow of current through the motor armature. In Fig. 23 we have shown two reversing positions, indicated at 1$^R$ and 11$^R$. In position 1$^R$ the following circuit is established: From the generator armature G$^3$, through interpole field G$^2$; conductor 96; contacts 116, 89; conductor 90; field G$^1$; conductor 97; motor field M$^1$; conductor 98; contacts 99, 107; conductor 106; contacts 82; conductor 105; motor armature M$^3$; interpole field M$^2$; conductor 103; contacts 101, 102, 100, 87; conductor 86; coil 57; conductor 85 and back to the generator armature. The action of magnet 57 will be the same as in the forward running positions, while the same amount of speed resistance 52 will be interposed as in the case of the first running position. The circuits for the first reverse speed are shown in Fig. 13, and will be recognized as being the same as in the first running position (Fig. 7) with the exception that the connections to the motor armature are reversed.

The circuits for the second reverse speed (position 11$^R$) will be the same as in the first reverse (Fig. 13) excepting that the connection with the speed resistance 52 will be the same as for the second running position (Fig. 8).

Braking of the vehicle when running at any of the various speeds may be effected by reversing the connection between the generator and motor so that the latter will act as a generator to drive the generator G as a motor to drive the engine 1, thus imposing a braking torque on the vehicle. This may be accomplished by turning drum D' to "braking" position. With the drum D in any of the positions 1 to 5, the connections between the machines G and M will be as shown in Fig. 14, that is, with the cross connections 133, 134. The circuit may be traced in Fig. 23 as follows: From the generator armature G$^3$, through interpole field G$^2$, to contacts 116, 102, 100, 99; motor field M$^1$; generator field G$^1$; contacts 89, 101; motor interpole field M$^2$; motor armature M$^3$; contacts 82; contacts 107, 87 and back through coil 57 to the other side of the generator armature.

The braking position of drum D' also bridges contact brushes 93, 127. This acts to short circuit the main field G$^1$ of the machine G as indicated by conductor 135 (Fig. 14). As this machine is now acting as a motor, this short circuit tends to cause the machine to run at a high speed, which in turn applies a high braking torque to machine M which is now acting as a generator.

Braking in the second running position is shown in Fig. 27, where a small portion of resistance 52 is introduced in the short circuit 135. This is introduced where the path of the current changes at contact 119 and passes through conductor 118; through the upper section of resistance to contacts 120, 88, and from there back to the field G$^1$ as in the first running position. The introduction of this resistance reduces the speed of the machine G and consequently also the torque on the machine M.

When braking in the third running position, the short circuit is omitted.

In the fourth position, braking short circuits the field M$^1$ of machine M as shown at 135' in Fig. 28. This circuit runs from field M$^1$, through conductors 97, 91, 92; contacts 93, 127, 119, 99 and back to the field. In the 5th braking position the circuit is the same, excepting that at contact 119 it passes through a portion of resistance 52, and out through contact 140, thus shunting resistance across the field of machine M.

Braking when the driving and driven shafts are coupled for one-to-one drive may be effected in several ways. One of these ways is to turn the drum D from the fourth position which it is then occupying to the third or fifth position, preferably, the third and at the same time applying the braking pedal. In order that braking may be effected by merely actuating the braking pedal, as in the other instances, however, we may employ means which will respond to movement of the pedal to release the one-to-one drive connection, so that the fourth driving speed connections through the machines G and M are restored with the braking circuits in operation.

In Fig. 23 we have shown a switch 141 in conductor 124. This switch is shown in diagrammatic form in Fig. 30, and may comprise a pair of contact members 142, 143. Member 143 is shown as connected by a link 144 to the braking pedal 145. The switch is normally closed, but is opened whenever the pedal is depressed. As current flows through conductor 124 only when the one-to-one drive is in use, it will be seen that the opening of this switch will not affect the operation of the apparatus at any other time. But when the one-to-one drive is in operation and the switch is opened, the clutch coil 29 and the magnet coil 59 will become deenergized, discontinuing the one-to-one drive and reverting to the fourth speed position of the electric drive with drum D' in braking position. This will establish the circuits shown in Fig. 28.

Figure 16:
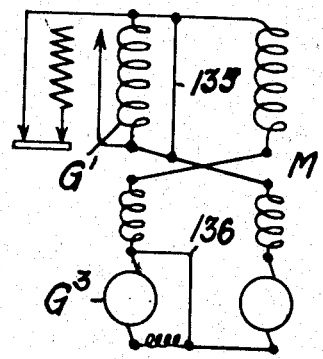
Figs. 16 to 22 represent connections adapted to brake the driven member under its various speed connections.

Braking in neutral or "off" position short circuits the field $G^1$ as in the first position (Fig. 14) and in addition, short circuits the armature $G^3$, as shown at 136 in Fig. 16. This short circuit may be traced from armature $G^3$, through conductor 84, to contacts 122, 87; conductor 86; coil 57; conductor 85 and back to the other side of the armature.

Braking in the first and second reverse positions is, of course, the same as in the first and second running positions, respectively.

It will be recognized that the braking torque is strongest in the "off" position. Thus, braking when running at high speeds may ordinarily be gradual. But should it be desired to come from a high speed to a quick stop, the controller drum may be turned back to "off" position where the strongest braking will be applied.

While the effectiveness of this braking is suitable for ordinary purposes, we have designed a system for braking heavier vehicles, such for instance, as buses. This system permits strong braking in any of the running positions. The complete wiring diagram for the system is shown in Fig. 24. In this diagram the starting, running, reversing and "off" positions are the same as those disclosed in Fig. 23. The controller, however, employs additional brush contacts 128, 129, 130 which are associated with additional resistances 131', 132. These resistances are adapted to be shunted around the armature of the machine G. Braking in "off" or neutral position in Fig. 24 will yield the results shown in Fig. 16, being therefore, the same as neutral braking in Fig. 23. The path of the armature shunt circuit in Fig. 24 is the same as in Fig. 23, and therefore, will not be traced here. The short circuit 135 of the field $G^1$ runs from said field through conductor 91, 92; contacts 93, 89 and back to the field through conductor 90. This circuit will exist in braking in the several other positions in Fig. 24.

Figure 17:
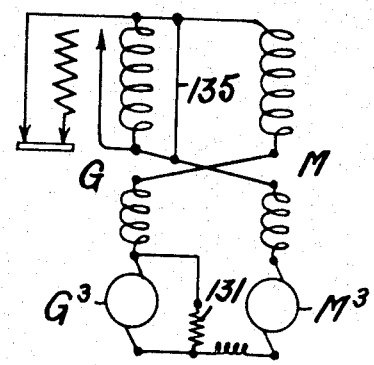

Braking in 1st position as shown in Fig. 17 introduces resistance 131' in shunt across the armature $G^3$ through the following circuit: From said armature, through conductor 128"; resistance 131'; conductor 137; contacts 128, 127; conductors 138, 139; contacts 130, 122; conductor 123 and back to the other side of the armature.

Figure 18:
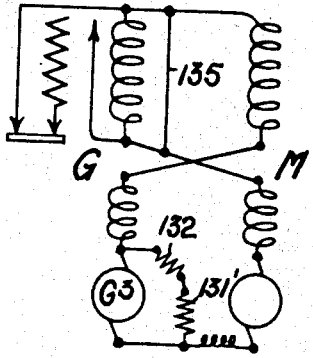
Figure 19:
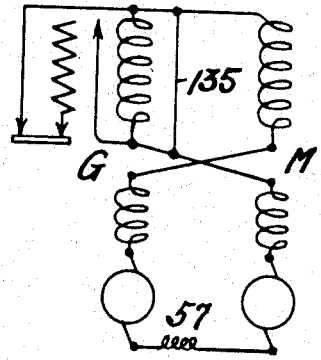

Braking in 2nd position is shown in Fig. 18 and shows the two resistances 131', 132 shunted across the armature $G^3$. The circuit in this instance is from the armature to resistance 131', to contacts 128, 127, to resistance 132, to contacts 129, 122 and back to the armature.

It is, of course, understood that the short circuit 136 across the armature $G^3$, has the effect of almost short-circuiting the machine M, which at this time is acting as a generator, thereby exerting a very powerful braking torque on the vehicle. The introduction of resistance into this short-circuit lessens the braking torque by increasing the resistance to the flow of current through this path. Thus the braking torque in Fig. 17 is less than that in Fig. 16, and that in Fig. 18 still less.

In the third position the torque is still further reduced by omitting the short circuit of the armature.

Figure 20:
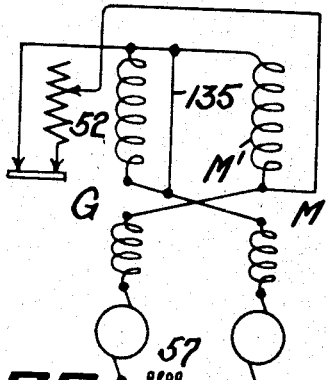
Figure 21:
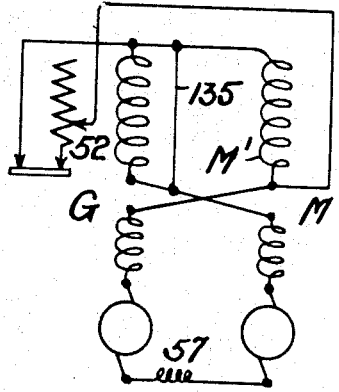
Figure 22:
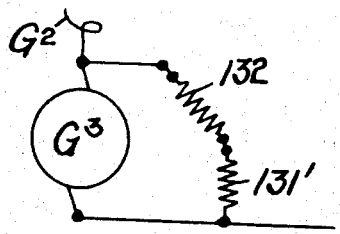

The fourth and fifth braking positions which are shown in Figs. 20 and 21 respectively show shunt circuits across the field $M^1$ of machine M. This further reduces the speed at which machine M drives machine G, so that the braking torque is likewise reduced, and is less in Fig. 21 than in Fig. 20. The shunt of field $M^1$ in Fig. 20 may be traced as follows in Fig. 24: From said field, through conductor 91; contacts 58; conductor 117; a portion of resistance 52 to contact 119; contact 99 and back to the field. In the fifth position the shunt circuit is the same, excepting that a smaller portion of resistance 52 is included, the outlet being through contact brush 140.

Referring again to the switch member 54

(Fig. 23) which is actuated by magnet 57, we have seen that when the generator is not operating, the spring 55 causes said member to close contacts 56 thereby shunting out resistance 53$^a$, but that when the strength of the generator field attains a predetermined value, magnet 57 trips the switch and bridges contacts 58. This reduces the separate excitation of the generator field and establishes connections for the introduction of resistance for speed control purposes. This arrangement has a further function, which is to prevent stalling of the engine when running in the fourth or fifth speeds for instance, and the vehicle begins to coast. Normally, when running, if the vehicle begins to coast, the current delivered from the generator to the motor first drops to zero, after which the motor momentarily acts as a generator utilizing the residual magnetism in its field and produces a reverse current which tends to drive the generator backward and to stall the engine. With the present arrangement, however, where the magnet 57 releases the switch when the generator current drops, the shunt circuit across the field M' is broken. This causes the motor field to build up instantly and kills the residual magnetism in the opposite direction so that the motor cannot act as a generator.

Also, in the braking positions where the connections between the machines are such that the motor, acting as a generator tends to drive the generator as a motor in a forward direction, the battery 51 is connected across the field M' to excite the same. This causes a rapid building up of the field so that quick and effective braking is produced. The excitation circuit for braking in first position, for instance, may be traced as follows: From field M$^1$, through conductors 97, 115; across contacts 56; through resistance 53$^b$, conductor 113; contacts 112, 111; conductor 110; across contacts 83, conductor 109; battery 51; conductor 84; interpole G$^2$; conductor 96; contacts 116, 102, 100, 99 and back by way of conductor 98 to field M$^1$.

In order that the starting connections controlled by drum D' may not be established when drum D is in a running position, we have shown in Figs. 30 and 31, means for preventing turning of drum D' to starting position at such times. In Fig. 31 the drums are shown on a shaft 146. Drum D may be fixedly secured to the shaft and is shown diagrammatically as operable by rotation of said shaft through bevel gears 147, rod 148 and lever 149. Drum D', on the other hand may be loosely mounted on the shaft, and provided with a lever 150 fixed thereto and connected by a link 151 (see also Fig. 30) to the pedal 145. Lever 150 has a projection 152, while a stop member 153 is shown pivoted at 154 to the casing 155. Said member is held in the path of projection 152 by a spring 156. A wheel 157 having a cam projection 158 is fixed on the shaft 146 to rotate therewith and with the drum D, the cam being so placed that it will engage and move the stop 153 to dotted line position 153' out of the path of projection 152 when drum D is in starting position. In Fig. 30, lever 150 is shown in its normal or running position. Dotted lines 150' represent this lever in braking position with the projection 152 resting against the stop 153. Ordinarily the lever cannot be moved beyond this point, but when cam 158 moves stop 153 to dotted line position 153', the lever may be moved to dotted line position 150" which is the starting position. The spring 159 is adapted to maintain or return the pedal and associated parts to running position which as we have seen is their normal position.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described our invention what we claim and desire to secure by Letters Patent is:

1. In an electric transmission system, a driving element, a generator connected therewith, a driven element, a motor coupled thereto and electrically connected with said generator, a one way clutch for interconnecting said elements, and means controlled by the relative speed of said elements for rendering said clutching means operative.

2. In an electric transmission system, a driving element, a generator connected therewith, a driven element, a motor coupled thereto and electrically connected with said generator, a one way clutch between said elements, and means independent of variations in the current and voltage of the transmission system and controlled by the relative speed of said elements for operating said clutch.

3. In an electric transmission system, a driving element, a generator connected therewith, a driven element, a motor coupled thereto and electrically connected with said generator, a one way clutch between said elements, and means independent of variations in the current and voltage of the transmission system for automatically operating said clutch.

4. In a power transmission system, a driving element, an electrical generator connected thereto and driven thereby, a driven element, a motor connected thereto for driving the same, said motor being electrically connected to said generator, a coil spring clutch between said elements, means controlled by the relative speeds of said elements for rendering said clutch operative, and means for rendering the said motor and generator inoperative when said clutch is brought into operation.

5. In a power transmission system, a driving element, an electrical generator connected thereto and driven thereby, a driven element, a motor connected thereto for driving the same, said motor being electrically connected to said generator, a one way snubbing post action clutch for connecting said elements, a movable member driven differentially by said elements, and means connected with said movable member for controlling the operation of said clutch.

6. In combination, a driving element, a generator connected thereto, a driven element, a motor connected thereto and electrically connected to said generator, a controller movable to a plurality of positions for controlling the speed of said motor, a one way spring clutch for coupling said elements, means controlled by the position of said controller and the relative speeds of said elements for rendering said clutch operative, and means for rendering said clutch inoperative.

7. In an electric transmission for automotive vehicles, a generator having a series field winding, a variable resistance shunted across said field for controlling the output of the generator, a separate source of E. M. F., means for establishing in starting a circuit from said E. M. F. through said field and for rendering said resistance ineffective, and means brought into action by the current produced by said generator for substantially cutting out said E. M. F. and for rendering effective said resistance.

8. In combination, a generator having interpole and main series field windings, a source of E. M. F. temporarily shunted around said fields in starting, a resistance element included in said shunt circuit, means normally short circuiting said element, means controlled by the current produced by said generator for opening said short circuit, a second resistance, means actuated by said controlled means for connecting said second resistance across said main fields, and a controller for varying the amount of said second resistance so connected.

9. In an electric transmission system, a driving element, a generator connected thereto, a driven element, a motor connected thereto and electrically connected to said generator, a controller adapted when in off position to short circuit said generator and motor, and a second controller adapted, when said first mentioned controller is in said off position to change the connections between said motor and generator whereby said motor tends to drive said generator.

10. In combination, a vehicle, a prime mover therefor, a dynamo electric machine coupled to said prime mover to be driven thereby, a second dynamo-electric machine electrically connected to said first named machine and adapted to drive said vehicle, a source of E. M. F. normally connected across the field of said first named machine, means for reversing the connections between said machines, and means controlled by said reversing means for causing said source to be disconnected from said field and for connecting the same across the field of said second named machine.

11. In combination, a vehicle, a prime mover therefor, a dynamo electric machine coupled to said prime mover to be driven thereby, a second dynamo-electric machine electrically connected to said first named machine and adapted to drive said vehicle, a source of E. M. F., means for reversing the connections between said machines, and means controlled by said reversing means for connecting said source across the field of said second named machine.

12. In combination with an automotive vehicle, of a driving element, an electro-dynamic machine coupled thereto, a driven element, an electro-dynamic machine coupled thereto and electrically connected to said first named machine, a resistance element, means for connecting variable portions of said resistance across the field of either of said machines, an auxiliary source of E. M. F., and means for temporarily connecting said source across the field of either of said machines to assist in building up the fields thereof.

13. In an electric transmission system, a driving element, a generator connected thereto and driven thereby, a driven element, a motor connected thereto for driving the same, said motor being electrically connected to said generator, a one way clutch for connecting said elements, means controlled by the relative speeds of the driving and driven elements for rendering said clutch operative, a brake control member, and means controlled by said member for rendering said clutch inoperative.

14. In a transmission system for automotive vehicles, the combination with a prime mover, of a plurality of dynamo-electric machines one of which is adapted to drive the other and to be driven by the prime mover, a plurality of controllers for said machines, one of said controllers being adapted to reverse the function of at least one of said machines for effecting braking of the system and the other of said controllers being adapted to control the degree of braking.

15. In a transmission system for automotive vehicles, the combination with a prime mover, of a generator, a motor connected thereto, means including resistance and contacts for varying the speed at which the generator drives the motor, and braking control means for changing the connections between the machines for causing the motor to drive the generator, said changing of connections being such that the motor will supply to the generator driving torque inversely proportionate to the speed of said motor.

16. In an electric transmission system for automotive vehicles, the combination with a generator having a series field and motor, a variable resistance for varying the relative speeds of said generator and motor, and means whereby said resistance is rendered ineffective until said generator has built up a predetermined current.

17. In an electric transmission system for automotive vehicles, the combination with a series generator and motor, a variable resistance shunted around the generator field for varying the relative speeds of said generator and motor, and means whereby said resistance is rendered ineffective until said generator has built up a predetermined current.

18. In an electric transmission system for automotive vehicles, the combination with a series generator and motor, a variable resistance shunted around the generator field for varying the relative speeds of said generator and motor, and means for cutting out said shunt circuit when the current flowing in the circuit falls below a predetermined amount.

19. In combination, a driving element, an electro-dynamic machine coupled thereto, a driven element, an electro-dynamic machine coupled thereto and electrically connected to said first named machine, a resistance element, means for connecting said resistance element across the field of either of said machines, and means controlled by the load relationship between said machines for disconnecting the resistance element from said field to which it is connected at the time.

20. In an electromechanical transmission system for automotive vehicles in combination with a prime mover, a generator and motor, of a coil spring clutch for directly coupling the generator and motor, a friction clutch adapted to control the operation of said spring clutch, and means for bringing into operation said friction clutch.

21. In an electric transmission for automotive vehicles, a series generator normally driven from the engine, a series motor connected to the driving member, a shunt field regulator for the two fields, a battery, and means for temporarily connecting the battery either to the generator or motor field depending on which machine is being built up as a generator at the time, said means also serving to temporarily cut out the connected shunt field regulator.

22. In a transmission system for a vehicle, a prime mover, a running gear therefor, means for accelerating said gear, a one-way clutch mechanism located between said prime mover and said gear, and means whereby said clutch is controlled by the relative speed of the said prime mover and gear for rendering the said clutch operative and means for simultaneously disconnecting the accelerating means when said clutch is operated.

23. In a transmission system for a vehicle, a prime mover, a running gear therefor, means for accelerating said gear by speeding up the said prime mover, a one-way clutch mechanism located between said prime mover and said gear, means whereby said clutch is controlled by the relative speed of the said prime mover and gear for rendering the said clutch operative and means for simultaneously disconnecting the accelerating means when said clutch is operated.

24. In a transmission system for automotive vehicles, the combination with the prime mover, of a generator driven thereby, a motor adapted to be driven by the generator in accelerating the vehicle, a one-way clutch for directly connecting said prime mover to the drive wheels, an auxiliary clutch for expanding said first named clutch when the speed of the prime mover exceeds that of the motor, and means for breaking the connection between said motor and generator, whereby as the speed of the prime mover tends to pass that of the motor the first mentioned clutch takes hold.

25. In a transmission system for automotive vehicles, the combination with the driving and driven shaft, a prime mover connected to the former, a torque multiplying accelerating means for driving the latter shaft at normally less speed than the former, a one-way clutch adapted to couple said shafts, an auxiliary clutch for placing said one-way clutch in a condition in which it will couple said shafts when the speed of the driving shaft tends to pass that of the driven shaft, and means brought into action when the speed of the driven shaft tends to pass that of the driving shaft for closing said auxiliary clutch.

26. In a transmission system for automotive vehicles, the combination with the driving and driven shafts, a prime mover connected to the former, a torque multiplying accelerating means for driving the latter shaft at normally less speed than the former, a one-way clutch adapted to couple said shafts, an auxiliary clutch for placing said one-way clutch in a condition in which it will couple said shafts when the speed of the driving shaft tends to pass that of the driven shaft, and means brought into action when the speed of the driven shaft tends to pass that of the driving shaft for closing said auxiliary clutch and for throwing out said accelerating means.

27. In a transmission system for automotive vehicles, the combination with the driving and driven shaft, a prime mover connected to the former, a torque multiplying accelerating means for driving the latter shaft at normally less speed than the former, a one-way clutch adapted to couple said shafts, an auxiliary clutch for placing said one-way clutch in a condition in which it will couple said shafts when the speed of one of said shafts tends to pass that of the other shaft, and means brought into action under the reverse condition of relative speeds of said two shafts for closing said auxiliary clutch.

28. In a transmission system for automotive vehicles, a prime mover, a driven shaft, a torque multiplying device for driving the latter in accelerating the vehicle, and an alternative straight-through connection from said prime mover to said shaft comprising a snubbing post action clutch, an auxiliary clutch adapted to control the action of said first named clutch, and means for bringing said auxiliary clutch into action.

29. In a transmission system for automotive vehicles, a prime mover, a driven shaft, a torque multiplying device for driving the latter in accelerating the vehicle, and an alternative straight-through connection from said prime mover to said shaft comprising a coil spring clutch, a friction clutch adapted to control the operation of said spring clutch, and speed responsive means from bringing said friction clutch into action.

30. In a transmission system for a vehicle, a prime mover, a running gear therefor, means for accelerating said gear, a clutch mechanism located between said prime mover and said gear, and means whereby said clutch is controlled by the relative speed of the said prime mover and gear for rendering the said clutch operative and also for rendering inoperative the accelerating means when said clutch becomes operative.

31. In a transmission system for a vehicle, a prime mover, a running gear therefor, means for accelerating said gear, a clutch mechanism located between said prime mover and said gear, and means whereby said clutch mechanism is controlled by the relative speed of said prime mover and said gear for rendering the said clutch operative and for simultaneously rendering inoperative the accelerating means.

32. In combination with an automotive vehicle, of a driving element, an electro-dynamic machine coupled thereto, a driven element, an electro-dynamic machine coupled thereto and electrically connected to said first named machine, a resistance element, means for connecting variable portions of said resistance across the field of either of said machines, an auxiliary source of E. M. F., and means for temporarily connecting said source across the field of either of said machines to assist in building up the fields thereof, said last-named means also acting to render said resistance element ineffective.

33. An electric transmission, in combination with a prime mover, a generator and motor, said motor having a series field winding, a shunt regulator therefor, and automatic means responsive to drop in the current supplied by said generator of a predetermined amount for cutting out said shunt resistance to prevent said motor from temporarily generating current and stalling the engine.

In testimony whereof we have affixed our signatures.

HARCOURT C. DRAKE.
ELMER A. SPERRY.